Oct. 2, 1928.  
L. C. BLOMSTROM  
1,686,198  
APPARATUS FOR HOLDING HALF BEARINGS IN POSITION FOR MACHINING  
Filed Aug. 6, 1927  2 Sheets-Sheet 1
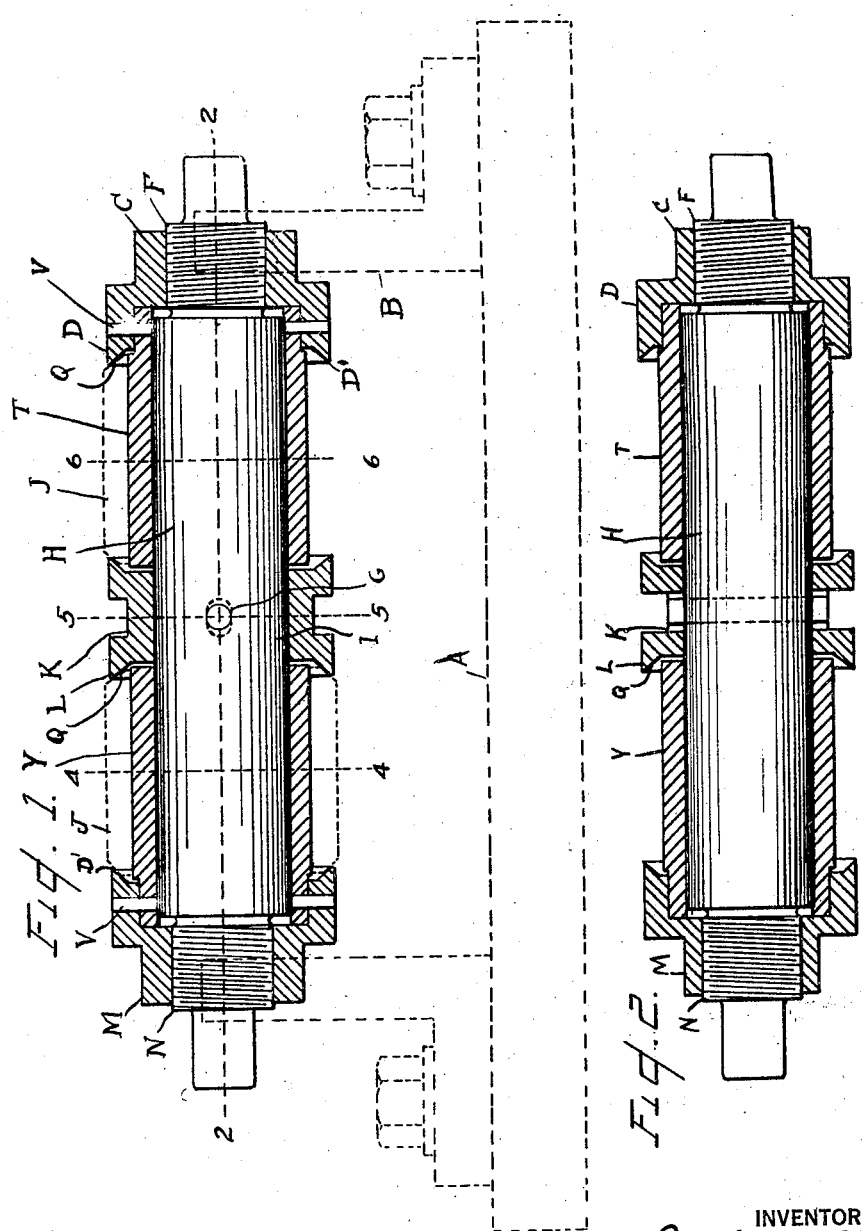
INVENTOR  
Lowell C. Blomstrom  
BY  
Swan Frye and Murray  
ATTORNEYS Oct. 2, 1928.

L. C. BLOMSTROM 1,686,198

APPARATUS FOR HOLDING HALF BEARINGS IN POSITION FOR MACHINING

Filed Aug. 6, 1927   2 Sheets-Sheet 2

INVENTOR
Lowell C. Blomstrom
BY
Swan Frye and Murray
ATTORNEYS

Patented Oct. 2, 1928.

1,686,198

UNITED STATES PATENT OFFICE.

LOWELL C. BLOMSTROM, OF DETROIT, MICHIGAN, ASSIGNOR TO FEDERAL MOGUL CORPORATION, OF DETROIT, MICHIGAN, A CORPORATION OF MICHIGAN.

APPARATUS FOR HOLDING HALF BEARINGS IN POSITION FOR MACHINING.

Application filed August 6, 1927. Serial No. 211,087.

This invention relates to apparatus for holding half bearings in position for grinding or other machine work upon their external surfaces, and has for its object an improved organization of parts by means of which a number of such articles may be mounted up on one frame or support, properly aligned for either contemporaneous or successive machining operations. While, for the sake of economy of operation, it is generally advisable to mount the bearings in pairs, the apparatus herein disclosed makes it possible to load only one half of the peripheral extent of any bearing supporting section and hold the bearing against undesired movement with equal efficiency as though there were two semi-circular bearings completely, or practically completely surrounding the holding arbor.

In the drawings:

Figure 1 is an elevational view partly in section of my improved apparatus, with the position of the bearings indicated in dotted lines on the upper half, as well as the dotted-in representation of the supporting frame, which as such forms only an accessory feature of this invention.

Figure 2 is a partly sectional plan view taken along the line 2—2 of Figure 1.

Figure 3:
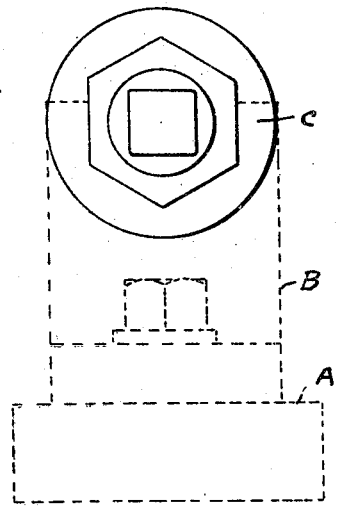
Figure 3 is an end elevational view of the device mounted in the dotted-in representation of one of the terminal supports.

It is uneconomical, dangerous, and likely to result in inaccuracies in the degree of the machine cut, to manually hold a bearing shell in relation to a grinder or other machine tool, which it is desired shall finish off with a high degree of accuracy the outer curved periphery of the shell or half bearing. It is also very wasteful of the operator's time to rely upon a device which mechanically handles but one bearing shell at a time. My invention herein disclosed provides means for obviating these objections in a way that not only reduces to a minimum any danger to the operator, but permits accurate machining of the individual bearings either consecutively or in rapid succession, and which permits their position relatively to the cutting tool to be so accurately adjusted that the exact depth of cut upon the metal of the half bearing may be easily had.

To this end I provide a frame or support A, from which rise suitably spaced struts B. In the upper end of each of these struts is positioned the end of bearing clamps, as C and M, each of which is held against rotative movement about its axis by the fit of its squared or hexed shoulders in the correspondingly cut-away portions of the struts B, but which is capable of very slight movement lengthwise of its axis. Viewed cross-sectionally each bearing clamp is stepped at its outer edges so as to form an over-engaging edge or lip D, whose face, toward the center of the device as a whole, is preferably bevelled at D', for overengagement with the correspondingly, or nearly correspondingly, bevelled edge of the bearing J which is to be placed in the device for machining. The neck portion of each bearing clamp C is interiorly threaded, but the threadings on one of the two clamps employed in each device, as for example, the clamp C at the right-hand end in Figure 1 are of opposite pitch to the threadings on the companion clamp M at the left-hand end of the device, though they are of otherwise identical construction and contour. Through these threaded portions of each of the clamps engage the correspondingly threaded end portions F and N of an arbor H, and interiorly or centrally from each of the terminal clamps C and M extend sleeves T and Y respectively which serve to space the bearing shells J from the surface of the arbor H and thus protect them from the rotative influence of the arbor H when actuated. These sleeves are held in position relatively to the terminal clamps C and M by some such means as the pins or bolts V. While they are desirable adjuncts to the operation of the device, being in effect extensions of the clamps C and M, they may be omitted and the half bearings mounted with their interior or concave surfaces directly against the surface of the arbor H.

Intermediately between the clamps C and M is fixed about the arbor H a wrench hold clamp K, each of whose outer faces is bevelled as at L, similarly to the overengaging lip portion D' of the terminal clamps. By means of the transverse pin G the wrench hold clamp K is held against rotative movement with respect to the arbor H, but it is capable of slight lengthwise movement due to the provision of the elliptical slot I through the clamp K. The threadings upon the end of the arbor and upon the interior surfaces of the clamps C and M being of relatively sharp pitch, only a comparatively small fraction of a complete turn of the wrench hold clamp K, and consequently of the arbor H, is necessary to effect the projection toward and away from it and from each other of the two terminal clamp members C and M; thus after either a half bearing, or two half bearings, have been placed between the opposing bevelled edges of the central clamp and each of the terminal clamps, the very slight induced lengthwise movement along the arbor of the clamps C and M and, if used, their respective sleeves T and Y is sufficient to throw the parts into firm holding engagement with respect to the inserted half bearing; and the arbor, with the half bearings thus temporarily held against movement on it, either rotative or lengthwise, can then be inserted in proper position relatively to the grinding or other machining tool's action to which it is designed to subject them.

Figure 4:
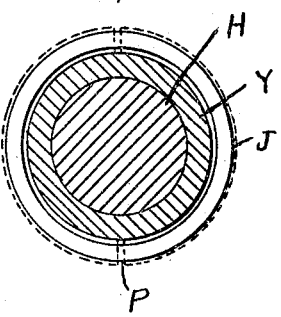
Figure 4 is a sectional view taken along the line 4—4 of Figure 1.
Figure 5:
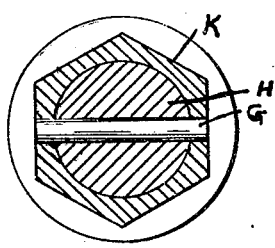
Figure 5 is a similar view taken along the line 5—5 of Figure 1.
Figure 6:
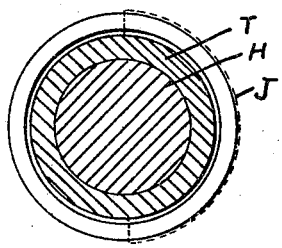
Figure 6 is a similar view taken along the line 6—6 of Figure 1.

It will be noted that the outer edge of each of the bearings, whose position is indicated in dotted lines in Figure 1, is not quite in alignment with the adjacent engaging edge of the clamps C and M respectively. These points are indicated at Q in Figure 1. Provision may thus be made for slight inaccuracies of fit between the bevelled angle on the bearing's edge and that on the lip of the clamp, so that if there has been any lack of uniformity in preceding shop operations which have resulted in the bevelling of the edge of the bearing, the relatively hard metal of the clamp lip can eat into the mass of the half-bearing sufficiently to provide a firm clamping effect. This is a desirable though not an indispensable feature of the construction herein disclosed. In Figure 4 I have brought out the fact that some bearings are made of slightly less than full half circular extent, so that when they are mounted, tightly fitting as far as their interior concaved surfaces are concerned, about the supporting arbor H, the clamping device will still function with equal efficiency, even though there be a slight space, as P, between their almost meeting straight edges. In Figure 6 I have indicated partly in full lines and partly in dotted lines the possible positioning of only one half bearing upon the arbor, leaving the other half peripheral space vacant. In view of the firm marginal clamping of the bearing shell already described, this can be indulged in without impairment of the accuracy of the holding of the single shell by the clamp members E and K or M and K.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. The combination, with terminal supporting members, of a pair of end clamping members supported thereby, each being horizontally bored and provided with screw threadings of reverse pitch one to the other, a carrying arbor provided at its ends with complementary screw threading to that of the adjacent clamping member wherein each end rests, and a central clamping member fixed against rotation on said carrying arbor though capable of limited lengthwise movement with respect thereto, between whose marginal clamping faces and the opposite clamping faces of said end clamping members bearing shells are adapted to be removably held.

2. Means for supporting half bearings during machining, comprising, in combination with a frame member, a pair of shell-engaging members held non-rotatably thereby though capable of slight movement toward and away from one another, said shell members being axially bored and provided with screw threadings of opposite inclination, an arbor member provided with terminal screw threadings of complementary pitch to those in the adjacent shell-engaging members, and a central shell-engaging member carried by said arbor rotatably therewith, adapted to engage the opposite edges of the inserted bearings from those engaged by said shell-engaging members.

3. In combination with a shell-carrying member provided with terminal threadings of opposite pitch, complementarily threaded clamp members mounted on said threaded ends of the shell-carrying member, means for holding said clamp members against rotative movement, and an intermediately disposed clamp member fixed to rotate with said shell-carrying member and adapted to engage with its marginal edge portions the opposite ends of half bearings positioned about said shell-carrying member from those edges of the half bearings which are engaged by the adjacent operative faces of the terminally positioned clamp members as the latter are drawn theretowards by the actuated rotative movement of said shell-carrying member and its supported central clamp.

4. The combination, with a shell-supporting arbor having oppositely pitched terminal screw threadings, of correspondingly threaded clamp members operatively engaging the threaded ends of said arbor, a central clamp on said arbor fixed to rotate therewith, and means for holding said first-named clamp members against rotation when said arbor and its fixed clamp are rotatively actuated, thereby permitting the oppositely pitched threadings on the arbor to effect the lengthwise movement of said terminal clamp members toward or away from said central clamp, according to the direction of rotative movement imparted to the latter, and to its supporting arbor.

5. In combination with a shell-carrying arbor provided with terminal screw threadings of opposite pitch, clamp members provided with complementarily threaded bores operatively engaging the threaded ends of said arbor, an intermediately positioned clamp fixed to rotate with said arbor, and means for holding said first named clamp members against rotative movement when the arbor and its fixed clamp member are rotatively actuated, thereby causing concerted movement of said first-named clamp members toward and away from one another in response to the influence of the screw threadings.

6. Means for supporting a plurality of half bearings in position for external machining operations, comprising an arbor provided with screw threadings of opposite pitch and with a central collar whose opposite faces are adapted to engage the adjacent ends of bearing shells positioned about said arbor on either side of said collar, terminal clamp members provided with complementarily threaded bores operatively carried on each end of said arbor, and means for holding said terminal clamp members against rotation when said arbor is rotatively actuated, thereby enabling the screw threadings to effect the movement of said terminal clamp members toward or away from one another against or away from the opposite ends of the bearing shells from those engaged by said central collar according to the direction in which the arbor is rotatively actuated.

7. An arbor for holding half bearings for external machining operations, having, in combination with a shell-supporting body portion provided with oppositely inclined threadings at its ends and with a centrally positioned clamp member fixed to rotate therewith, a centrally threaded terminal clamp member operatively engaging each threaded end of said body portion, and means operatively engaging each of said terminal clamp members whereby they are held against rotation when the body portion and its central clamp member are rotatively actuated, thereby permitting the screw threadings on said body portion and on said terminal clamp members to effect the movement of the latter toward and away from the central clamp member according to the direction of the actuated rotative movement of the latter and of its supported arbor member.

8. The combination, with an arbor provided with oppositely threaded end portions and bearing supports therefor, of a wrench clamp positioned about the central portion of the arbor and rotatable therewith, and terminal bearing clamps positioned on the threaded ends of said arbor and limitedly movable lengthwise thereof toward and away from said central wrench clamp according to the induced rotative movement thereof.

9. In combination with a rotatable arbor member provided with oppositely threaded ends and an intermediately positioned wrench clamp portion rotatable therewith, a pair of terminal clamp members operatively engaging the threaded ends of said arbor and movable toward and away from the central wrench clamp portion thereof according to the actuated rotative movement thereof, and means for supporting said arbor for rotative movement and for holding said terminal clamp members against the rotative influence of the operative engagement of said threaded arbor ends thereupon.

10. In combination with a supporting frame, an arbor provided with oppositely directioned threadings at its ends, rotatably journaled in said frame, a wrench clamp positioned intermediate the ends of said arbor and rotatable therewith, means for permitting limited lengthwise movement of said wrench clamp relatively to said arbor, and a pair of terminal clamping members having complementarily threaded bores to the threadings on the end of said arbor, by whose actuated rotated movement said terminal clamping members are moved toward or away from said wrench clamp member, said terminal clamping members being held against rotative movement by the engagement of said supporting frame therewith.

In testimony whereof I sign this specification.

LOWELL C. BLOMSTROM.